United States Patent
O'Dowd et al.

(10) Patent No.: US 11,169,025 B2
(45) Date of Patent: Nov. 9, 2021

(54) SYSTEM AND METHOD FOR INTERROGATING AN INTRINSIC FIBER OPTIC SENSOR

(71) Applicant: FAZ TECHNOLOGY LTD., Dublin (IE)

(72) Inventors: John O'Dowd, Dublin (IE); Devrez Mehmet Karabacak, Dublin (IE); Roger Maher, Dublin (IE); Vivian Bessler, Dublin (IE); Lymperis Voudouris, Dublin (IE)

(73) Assignee: OPTICS11 FAZ LIMITED, Dublin (IE)

( * ) Notice: Subject to any disclaimer, the term of this patent is extended or adjusted under 35 U.S.C. 154(b) by 193 days.

(21) Appl. No.: 16/479,917

(22) PCT Filed: Jan. 23, 2018

(86) PCT No.: PCT/EP2018/051611
§ 371 (c)(1),
(2) Date: Jul. 22, 2019

(87) PCT Pub. No.: WO2018/138099
PCT Pub. Date: Aug. 2, 2018

(65) Prior Publication Data
US 2019/0383664 A1 Dec. 19, 2019

(30) Foreign Application Priority Data
Jan. 26, 2017 (EP) .................................. 17153397

(51) Int. Cl.
*G01J 3/18* (2006.01)
*G01D 5/353* (2006.01)
*G01J 3/28* (2006.01)

(52) U.S. Cl.
CPC ........ *G01J 3/1895* (2013.01); *G01D 5/35316* (2013.01); *G01J 3/28* (2013.01); *G01D 5/3537* (2013.01)

(58) Field of Classification Search
CPC ... G01J 3/1895; G01J 3/28; G01J 3/42; G01L 1/246; G01N 2021/7773;
(Continued)

(56) References Cited

U.S. PATENT DOCUMENTS

| 7,050,661 B2 * | 5/2006 | Lyons | G02B 6/022 385/12 |
| 2005/0134861 A1 * | 6/2005 | Kringlebotn | G01J 3/28 356/480 |

(Continued)

OTHER PUBLICATIONS

PCT/EP2018/051611. International Search Report and Written Opinion dated Apr. 23, 2018. 15 pages.
(Continued)

*Primary Examiner* — Sunghee Y Gray
(74) *Attorney, Agent, or Firm* — Loza & Loza, LLP; Anthony G. Smyth (57) ABSTRACT

The present invention provides a method for measuring an optical sensor system comprising an array of intrinsic fiber optic sensors at an interrogator comprising an optical source and an optical detector. The method comprises the steps of emitting an optical signal to an array of intrinsic fiber optic sensors; detecting optical responses to the emitted signal from the sensors; associating each detected optical response with an individual sensor by determining within which region among a plurality of detection regions assigned to the individual sensors the optical response is detected wherein each detection region corresponds to a wavelength range in the bandwidth of the optical sensor system; and performing signal processing on each optical response to measure the value of the physical parameter detected by its associated sensor. A calibration of the detection region assigned to each sensor is performed at predetermined intervals.

15 Claims, 11 Drawing Sheets

(58) Field of Classification Search
CPC ... G01N 2021/7776; G01N 2021/7783; G01N 21/774; G01N 21/783; G01D 18/004; G01D 5/35316; G01D 5/35364; G01D 5/3537
USPC .......................................... 356/328, 477–483
See application file for complete search history.

(56) References Cited

U.S. PATENT DOCUMENTS

2010/0259752 A1* 10/2010 Shah ...................... B82Y 20/00
356/300
2017/0227707 A1* 8/2017 Lee .......................... G02B 6/08

OTHER PUBLICATIONS

Yujuan Wang et al, "Hardware embedded fiber sensor interrogation system using intensive digital signal processing", DOI: 10.1590/S2179-10742014000200003 external link Dec. 1, 2014 (Dec. 1, 2014), p. 139-155, Retrieved from the Internet: URL:http://www.scielo.br/pdf/jmoea/v13n2/v13n2a03.pdf.

Patrick Tsai et al, "A New Fiber-Bragg-Grating Sensor Interrogation System Deploying Free-Spectral-Range-Matching Scheme With High Precision and Fast Detection Rate", IEEE Photonics Technology Letters, IEEE Service Center, Piscataway, NJ, US,vol. 20, No. 4, Feb. 15, 2008 (Feb. 15, 2008), p. 300-302.

* cited by examiner

SYSTEM AND METHOD FOR INTERROGATING AN INTRINSIC FIBER OPTIC SENSOR

CROSS-REFERENCE TO RELATED APPLICATIONS

This application is the U.S. National Stage of International Patent Application No. PCT/EP2018/051611 filed on Jan. 23, 2018, which claims the benefit of priority from EP Patent Application No. 17153397.9 filed Jan. 26, 2017, the disclosures of the foregoing applications being incorporated herein by reference in their entirety for all applicable purposes.

FIELD

The invention relates to measuring systems comprising intrinsic fiber optic sensors. More particularly, the invention relates to methods for interrogating such fiber optic sensors, including the post-processing of the acquired data.

BACKGROUND

Intrinsic fiber optic sensors have become increasingly popular in several applications where more conventional electronic instrumentation has found to have many drawbacks. These include the need for expensive copper wires compared to cheap fiber optics as well as the need for isolation of such copper wires when used in an electrically conductive environment.

An intrinsic fiber optic sensor is a sensor that uses an optical fiber as the sensing element. In many applications the fiber optic sensor is lit (such as for example by a laser), and a change in the fiber due to an external cause results in a measurable change in the optical signal transmitted or received from the sensor. A typical example of an intrinsic fiber optic sensor is a Fiber Bragg Grating (FBG). Fiber Bragg Gratings are localized and narrow band reflectors whose reflection wavelength, also known as the Bragg wavelength, change due to extrinsic effects such as strain and temperature. As such, the Bragg wavelengths of FBGs have been successfully used in various sensing applications. Other types of intrinsic fiber optic sensors include fiber laser and Fabry-Perot.

Several types of intrinsic fiber optic sensors are known in the field. For example, WO2015023176 discloses a sensor for measuring pressure waves in a liquid wherein a sensing body transduces a pressure wave into a tension that is applied to a FBG. The measurement takes place by using the fact that the optical response of a FBG changes with the strain applied to the FBG.

WO2014023770 discloses a method for dynamically sweeping a tunable laser. The concept behind this invention is that when several sensors are located within the same system, a source has to emit light within a determined wavelength range for each of the sensors to be able to detect the changes on the reflection/transmission wavelength for such sensors.

Two main types of sources are known in the art, a broadband source (covering a large amount of wavelengths) and a tunable laser. The broadband source has proven to be inefficient, given that the data may actually be located only on 10%, or smaller, segment of the wavelength spectrum emitted. Therefore, the use of tunable lasers is preferable, given the possibility to control the emitted wavelength ranges. The power emitted for each of those wavelengths can also be controlled to be substantially constant. Furthermore, in a broadband source interrogation technique, the bandwidth of the source often covers the reflection spectra of multiple wavelength multiplexed FBG sensors in a fiber chain, such that their responses are required to be spectrally separated and analyzed. This results in the need of complicated detection systems that need to include spectral filtering functionality. As such, broadband systems often result in limitations in performance (such as the number of sensors that can be located in a specific band) and cost effectiveness. Furthermore, broadband sources have significant limitations on the minimum detectable reflective element, often requiring high reflectivity FBGs to be connected with minimal distance and coupling elements in the path. This again limits their use in the field for long distances and large arrays.

WO2014023770 discloses that a tunable laser may divide the wavelength spectrum into segments in order to avoid interrogating wavelength segments that contain no information.

Accordingly, a sensor system with an intrinsic fiber optic sensor typically comprises a source that emits an input signal that can be either a broadband signal or a tunable signal; an intrinsic fiber optic sensor that receives the input signal and transmits/reflects an output signal wherein such output signal is indicative of a physical parameter; and a detector that receives the output signal and processes such signal to give a measurement of the physical parameter. In the field, the source and the detector are known as an interrogator and, normally, the source and the detector are located within the same device. Also, typically, the output signal modifies the transmitted/reflected wavelength in view of the physical parameter, as is the case for FBGs.

In such sensor systems, it is necessary for the interrogator or analysis software system to identify individual reflections, and perform signal processing actions on the individual reflections, and track their reflection (Bragg) wavelengths accurately. In many cases the signal processing actions for each reflection will need to differ due to varying needs of amplification, timing and tracking parameters. As such, often a bandwidth region around the individual peak position requires signal processing with a specific set of parameters, creating a requirement for a challenging signal analysis scheme. A further problem arises in cases wherein the output signals reflected/transmitted by the sensors require wide operation range due to the large sensing ranges, or become too close to one another spectrally. In such applications, it may be hard to correlate each detected signal with a particular sensor and maintain its signal processing parameters, while still continuing to have the ability to have a high density of sensing points.

US Patent Publication No. US2005/134861 describes a wavelength reference system for optical measurements. US Patent Publication No. US2010/259752 describes sensors with Fiber Bragg Gratings and carbon nanotubes. However neither US2005/134861 nor US2010/259752 disclose adjusting or re-calibrating the individual sensing ranges during measurement in order to avoid an incorrect identification of a sensor.

Accordingly, it is an objective of the present invention to overcome at least one of the above mentioned problems.

SUMMARY

According to the invention, there is provided, as set out in the appended claims, a method for measuring an optical sensor system comprising an array of intrinsic fiber optic sensors at an interrogator comprising an optical source and an optical detector, the method comprising the steps of:

emitting an optical signal to an array of intrinsic fiber optic sensors;

detecting optical responses to the emitted signal from the sensors;

associating each detected optical response with an individual sensor by determining within which region among a plurality of detection regions assigned to the individual sensors the optical response is detected; wherein each detection region corresponds to a wavelength range in the bandwidth of the optical sensor system; and performing signal processing on each optical response to measure the value of the physical parameter detected by its associated sensor;

wherein a calibration of the detection region assigned to each sensor is performed at predetermined intervals, wherein the minimum bandwidth of the detection region assigned to each sensor during calibration corresponds to the required dynamic signal range of the sensor, and wherein the calibration of the detection region assigned to each sensor comprises:

determining if the spacing between the boundaries of two or more detection regions is less than a threshold value; and if it is determined that the spacing is less than the threshold value, proportionally reducing the bandwidth of all of the detection regions while retaining the required minimum bandwidth of each region until the spacing between the boundaries of the two or more detection regions exceeds the threshold value.

In one embodiment, the initial detection region assigned to each sensor is set during a configuration procedure and based on the optical response of each sensor under a set of calibration conditions.

In one embodiment, the center wavelength of the detection region assigned to each sensor during the configuration procedure comprises the wavelength value corresponding to the peak intensity of the optical response of the sensor under a set of calibration conditions.

In one embodiment, the optical response of each sensor under a set of calibration conditions corresponds to the optical response of each sensor prior to the physical parameter acting on the sensor.

In one embodiment, the minimum bandwidth of the detection region assigned to each sensor during calibration corresponds to the required dynamic signal range of the sensor.

In one embodiment, the method further comprises:

determining if the spacing between the boundaries of two or more detection regions is less than a threshold value; and providing an indicator if it is determined that the spacing is less than the threshold value.

In one embodiment, if it is determined that the spacing is less than the threshold value, proportionally reducing the bandwidth of all of the detection regions while retaining the required minimum bandwidth of each region until the spacing between the boundaries of the two or more detection regions exceeds the threshold value.

In one embodiment, the method further comprises equally allocating any remaining bandwidth between the detection regions once the minimum bandwidth of each detection region has been satisfied.

In one embodiment, the method further comprises allocating any remaining bandwidth between the detection regions once the minimum bandwidth of each detection region has been satisfied based on user input.

In one embodiment, the method further comprises allocating any remaining bandwidth between the detection regions once the minimum bandwidth of each detection region has been satisfied based on observed behavior of the optical sensor system.

In one embodiment, the method further comprises performing the calibration of the detection region assigned to each sensor at periodic time intervals.

In one embodiment, the method further comprises performing the calibration of the detection region assigned to each sensor after a predetermined number of sensor measurements.

In one embodiment, the method further comprises performing the calibration of the detection region assigned to each sensor when the difference between the detected optical response for a sensor and the optical response under the set of calibration conditions exceeds a threshold value.

In one embodiment, the predetermined intervals for performing the calibration of the detection regions assigned to each sensor is user programmable.

In one embodiment, the calibration of the detection region assigned to each sensor comprises the step of:

adjusting the center wavelength of the detection region for each sensor to the value of the detected optical response associated with the sensor.

In one embodiment, the method further comprises determining one or more parameters in respect of each detection region.

In one embodiment, the parameters defined in respect of each detection region are user programmable.

In one embodiment, the method further comprises:

determining one or more of the following parameters in respect of each detection region: the minimum amplitude of the optical response detectable in the region, the selected curve-fitting algorithm for extracting the features of an optical response detected in the region, the round-trip delay and the gain associated with the region.

In one embodiment, the step of performing signal processing on each optical response to measure the value of the physical parameter detected by its associated sensor comprises the steps of:

performing signal processing on a detected optical response based on the determined parameters in respect of the detection region of its associated sensor; and calculating the deviation between the signal processed optical response and the optical response of the sensor under a set of calibration conditions acting on the sensor to determine the value of the physical parameter detected by the sensor.

In one embodiment, the signal processing on a detected optical response may further comprise processing which takes into account one or more of: the distance of its associated sensor from the optical source; the losses and reflectivity of its associated sensor, the amplitude of the optical response of its associated sensor under the set of calibration conditions in comparison to any interfering spectral features, and the spectral features of its associated sensor.

In one embodiment, the calibration of the detection region assigned to each sensor is performed external to the interrogator.

In one embodiment, the calibration of the detection region assigned to each sensor is performed by the interrogator.

In one embodiment, the rate of calibration is less than the sensor measurement rate.

In one embodiment, the rate of calibration is equal to the sensor measurement rate.

In one embodiment, the step of emitting an optical signal comprises emitting a broadband optical signal having a bandwidth corresponding to the bandwidth of the optical sensor system.

In one embodiment, the step of emitting an optical signal comprises emitting an optical signal from a tunable optical source that performs a sweep over a bandwidth corresponding to the bandwidth of the optical sensor system.

In one embodiment, the method further comprises:
determining if an optical response in respect of all the sensors in the array has been detected within a predetermined time interval; and
providing an indicator if it is determined that an optical response has not been detected in respect of all the sensors within the predetermined time interval.

In one embodiment, the method further comprises performing a reacquiring procedure to identify in respect of which sensors in the array an optical response has not been detected.

In one embodiment, the reacquiring procedure comprises matching features of the sensors in respect of which an optical response has been detected to stored values for these features;
and determining based on the matching in respect of which sensors an optical response has not been detected.

In one embodiment, the features of the sensors on which the matching is performed comprises one or more of: the amplitude, the spectral width, peak symmetry and neighboring spectral features.

In one embodiment, the method further comprises the steps of:
illuminating one or more sensors;
determining the time taken to receive an optical response to the illumination from the one or more sensors; identifying the distance of a specific optical response from the interrogator with a particular sensor; and
determining based on the identification whether an optical response in respect of each of the one or more sensors has been detected.

In one embodiment, the optic sensors comprise Fiber Bragg Gratings, FBGs, and wherein each optical response detected comprises the Bragg wavelength of each FBG.

In one embodiment, one or more of the optic sensors comprises a sensor comprising multiple peaks and/or troughs.

In one embodiment, the sensor comprising multiple peaks and/or troughs comprises a birefringent fiber such that the optical response detected from the sensor comprises two reflection peaks, and wherein the signal processing on the detected optical response from the birefringent fiber further comprises processing which takes account of the wavelength separation between the two reflection peaks and the mean value of the peaks.

In one embodiment, the method further comprises performing a configuration procedure to assign an initial detection region to each sensor and determine the optimum settings of each sensor for the detection of the optical responses from the sensors.

In one embodiment, the configuration procedure comprises:
sweeping the optical signal at a low speed;
identifying the peak optical response associated with each sensor; and
assigning an initial detection region to each sensor based on the identified peak optical response of each sensor.

In one embodiment, the low speed corresponds to a frequency of less than 10 Hz.

In one embodiment, the method further comprises:
determining the optimum gain, the optimum number of fit points and the round trip distance in respect of each sensor; and
setting the gain, the number of fit points and the round trip distance in respect of each sensor to the determined values.

In another embodiment of the invention there is provided a method for measuring an optical sensor system comprising an array of intrinsic fiber optic sensors at an interrogator comprising an optical source and an optical detector, the method comprising the steps of:
emitting an optical signal to an array of intrinsic fiber optic sensors;
detecting optical responses to the emitted signal from the sensors;
associating each detected optical response with an individual sensor by determining within which region among a plurality of detection regions assigned to the individual sensors the optical response is detected; wherein each detection region corresponds to a wavelength range in the bandwidth of the optical sensor system; and
performing signal processing on each optical response to measure the value of the physical parameter detected by its associated sensor;
wherein a calibration of the detection region assigned to each sensor is performed at predetermined intervals.

In another embodiment of the invention there is provided an interrogator for measuring an array of intrinsic fiber optic sensors comprising:
an optical source for emitting an optical signal to an array of intrinsic fiber optic sensors; and
a detector, the detector comprising:
means for detecting optical responses to the emitted signal from the sensors;
means for associating each detected optical response with an individual sensor by determining within which region among a plurality of detection regions assigned to the individual sensors the optical response is detected; wherein each detection region corresponds to a wavelength range in the bandwidth of the optical sensor system; and
means for performing signal processing on each optical response to measure the value of the physical parameter detected by its associated sensor;
wherein a calibration of the detection region assigned to each sensor is performed at predetermined intervals, wherein the minimum bandwidth of the detection region assigned to each sensor during calibration corresponds to the required dynamic signal range of the sensor, and wherein the calibration of the detection region assigned to each sensor comprises:
means for determining if the spacing between the boundaries of two or more detection regions is less than a threshold value; and
if it is determined that the spacing is less than the threshold value, means for proportionally reducing the bandwidth of all of the detection regions while retaining the required minimum bandwidth of each region until the spacing between the boundaries of the two or more detection regions exceeds the threshold value.

In another embodiment of the invention there is provided an interrogator for measuring an array of intrinsic fiber optic sensors comprising:
an optical source for emitting an optical signal to an array of intrinsic fiber optic sensors; and a detector, the detector comprising:
means for detecting optical responses to the emitted signal from the sensors;
means for associating each detected optical response with an individual sensor by determining within which region among a plurality of detection regions assigned to the individual sensors the optical response is detected; wherein each detection region corresponds to a wavelength range in the bandwidth of the optical sensor system; and
means for performing signal processing on each optical response to measure the value of the physical parameter detected by its associated sensor;
wherein a calibration of the detection region assigned to each sensor is performed at predetermined intervals.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

The present invention discloses a system and a method for calibrating the interrogator in the detector side and, also, to better filter and interpret the obtained data.

Figure 1:
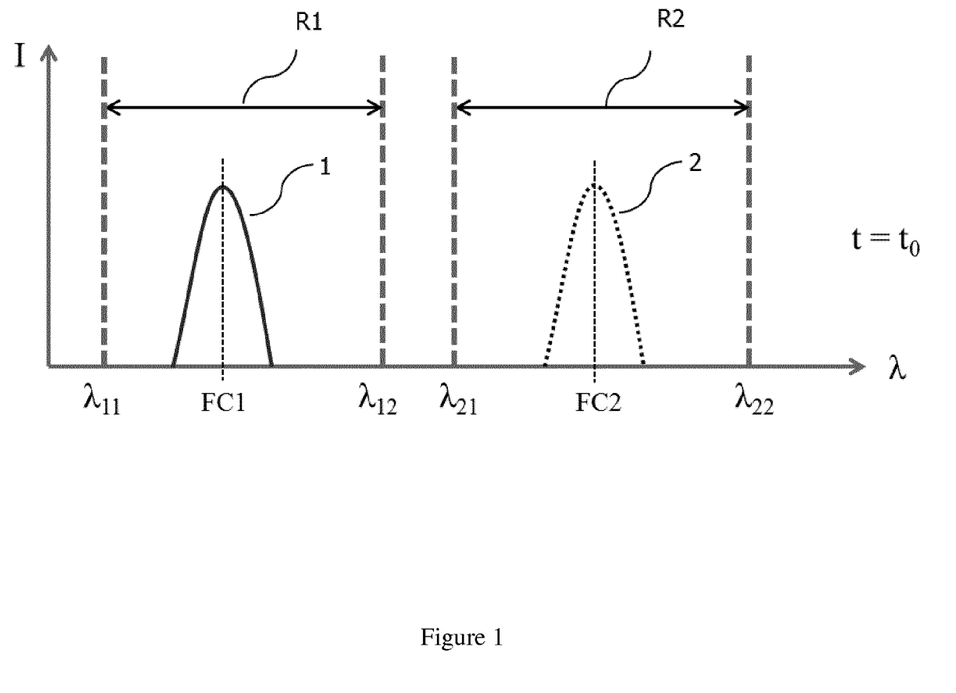
FIG. 1 shows an example of two signals detected in two separate designated operating regions at the receiver side of the interrogator.

FIG. 1 shows an example of a signal detected in the receiver side of an interrogator. In this particular example, an input signal has been emitted by a source, such input signal can be a signal emitted by either a broadband source comprising at least the wavelengths $\lambda_{11}$ to $\lambda_{22}$ or a tunable source that performs a sweep covering some of the wavelengths from $\lambda_{11}$ to $\lambda_{22}$.

In this particular example, there are two sensors measured by the system, a first sensor with a Bragg wavelength FC1 and a second sensor with a Bragg wavelength FC2. To be able to perform an accurate measurement, it is important to be able to process each signal individually and further analyze it. The signal processing may include, but is not limited to, timing correction based on the distance of the reflective Bragg element from the source, the amplification depending on the losses and reflectivity of the sensing element, the detection amplitude threshold depending on the amplitude of the Bragg wavelength in comparison to any interfering spectral features (such as side lobes that are common to Bragg gratings), minimum detection spectral width characteristics depending on the spectral features of the FBG as opposed to the interfering spectral features that can be in the band of detection, the number of fitting points and the fitting equation used in tracking the peak position.

With this purpose a first detection region R1 is assigned to the first sensor and a second detection region R2 is assigned to the second sensor. Upon measurement, it is expected that the first calibration signal (1) shifts in view of the physical parameter to be measured. If the output signal received by the detector falls within the first region R1, it is assumed that the signal corresponds to the first sensor. Likewise, if the signal falls within the second region R2, it is assumed that the signal corresponds to the second sensor.

Figure 2:
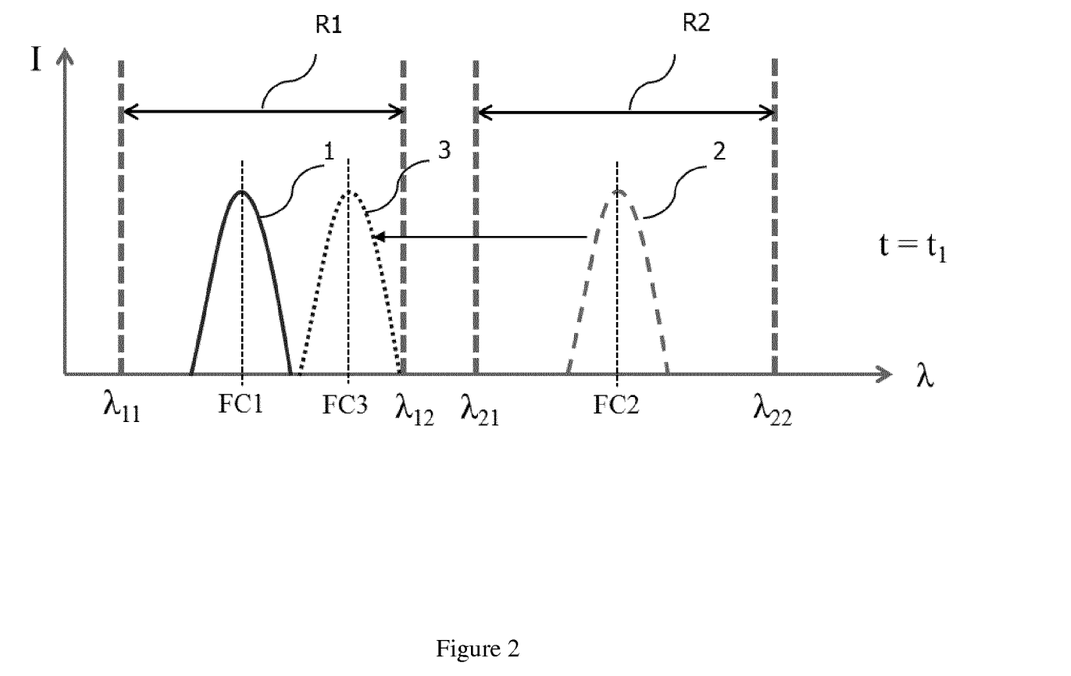
FIG. 2 shows a typical embodiment of wherein two measurement signals are received by a detector in the same region.

FIG. 2 shows one example of a measurement signal (3) received by the detector and originated from signal (2) when it moves out of its designated operating region R2. As explained with reference to FIG. 1, in the detector side, a Bragg wavelength is assigned for each sensor and a first detection region R1 and a second detection region R2 are predefined within the detector so that it can filter and analyze the received signal accordingly. FIG. 2 also shows the first calibration signal (1) (i.e., the signal for the first sensor without the physical property to be measured acting on it, or the 'zero' signal for measurements).

In addition, FIG. 2 shows a detected signal (3). As discussed above, since the detected signal (3) falls within the first detection region R1, the detector would identify the detected signal (3) as a signal corresponding to the first sensor.

Then, the detector calculates the deviation between the detected signal (3) and the first calibration signal (1) (in essence, the calculation would be the difference between FC1 and FC3) and then calculates a physical parameter based on such deviation.

Figure 3:
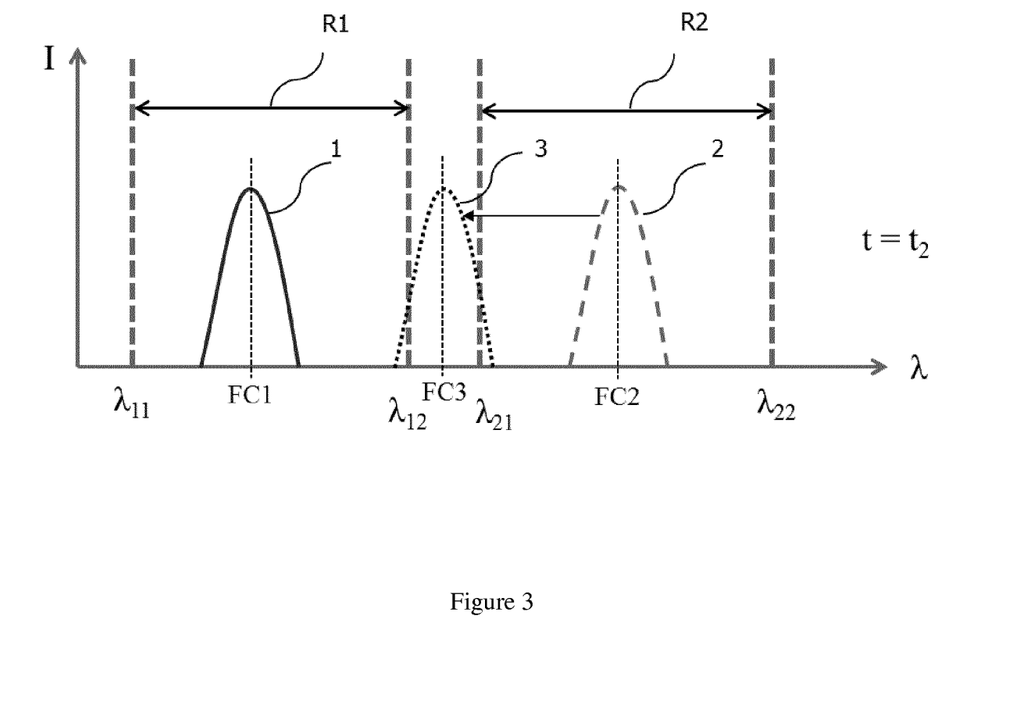
FIG. 3 shows a typical problem encountered by prior art interrogators when one sensor drops out of its original designated region.

FIG. 3 shows a typical problem encountered by prior art interrogators, in this case, the detected signal (3) is not within the first detected region R1 nor the second detected region R2. Therefore, the detector is not able to properly calculate the measured parameter.

In order to solve this problem, the present invention provides for a method wherein a re-calibration is performed with a predetermined frequency. In this way, the regions are dynamically assigned. Such recalibration comprises, setting the parameters of at least one of the regions. For example, the regions are re-calculated in view of at least one previous measurement for the sensor.

In the simplest scenario, the width of the window can be predetermined being the center of such window, as a starting point, the Bragg wavelength and in a re-calibration procedure the center is modified by the detected signal (3).

Other parameters can be set for each of the windows such as, for example, the minimum amplitude, the curve-fitting algorithm used to extract the features of the measured signal, the gain for each window, amongst others. In a particular embodiment of the present invention the number of points for analysis of each region can be setup and, also, a specific type of filtering can be applied to each of the windows.

In essence, what is intended is that a re-calibration is performed and such re-calibration can be triggered for example by a timer (e.g., every 10 seconds), by a measurement value (e.g., once a detected signal has a 20% variation with respect to the calibration signal) or by number of measurements (e.g., every 100 measurements). In one embodiment, the region adjustment rate is kept lower than the measurement rate of the sensors to prevent both slowing down of the measurement rate and eliminate region oscillations and conflicts with adjacent regions due to dynamic sensors. Alternatively, a recalibration may be performed every time a measurement is made if circumstances allow.

In one embodiment, the user can select the adjustment timescale of the regions as well as the region ranges based on the application parameters. In one non-limiting example, an array of FBG-based dynamic sensors such as accelerometers can be attached to the interrogation unit. For this application, the regions need have the spectral width to accommodate the high speed tracking of the vibration-induced Bragg wavelength shifts, i.e. dynamic signal, and the region adjustments need to be executed to allow for thermally-induced shifts in the wavelengths. As such, a minimum region allocation for each FBG sensor needs to be set based on the user and application defined dynamic signal range requirement, such that the region allocation software cannot misallocate said dynamic region to a spectrally neighboring FBG. Furthermore, the system automatically decides on a region boundary in between the two sensors already taking into account the different dynamic regions of each sensor. In one embodiment, the system equally splits the bandwidth range remaining between the sensors after the minimum region allocations are done. In an alternative embodiment, the regions can be split non-equally based on user input or observed sensor behavior.

In one embodiment, the system automatically identifies region clashes such that two sensors have approached each other too closely to have their full dynamic regions allocated, and reports the finding in an error log. In one embodiment, the system tries to accommodate such situations by proportionately reducing the dynamic regions of each sensor depending on their initial allocation, but also taking into account the spectral width of each sensor as a minimum threshold spacing needed for separation of signals.

In one further embodiment, the system automatically identifies sensors that have temporarily or permanently lost optical connectivity to the interrogator. The timeout period, defined as the time period in which no optical signal surpassing the optical threshold is received within a region, after which a sensor is identified by the system as "dead", can be user set or predefined.

In yet another embodiment, the system can have a "reacquire" function that automatically activates in the situation that one or more sensors become missing from their regions. In such situations, the system will try to reconfigure itself around the missing sensor by trying to match the remaining sensors to the previously stored latest configuration to ensure continuity in the time based recording of the sensors. Several features of the FBG peaks can be used for re-identifying the sensors, including reflection amplitude, spectral width, peak symmetry, neighboring spectral features such as side lobes etc. In yet another embodiment, the system can potentially have a distance measurement tool based on time of flight feature whereby one or more sensors are illuminated with a pulse of light and the time of receiving the reflection from the individual reflections is used in identifying the distance of a specific reflection from the unit as the unique identification of said sensor.

In a further embodiment, regions can be setup to have multiple spectral features, such as peaks or troughs, to accommodate various different types of sensors. In one non-limiting example, a region may have a fiber of the type which has two reflection peaks (such as for example birefringent fibers or microstructured fibers) such that the combined signal processing of the peaks yield sensing information, such that the wavelength separation between the received Bragg reflection as well as their mean value yield information on physical parameters, such as strain, temperature and pressure. In such sensors, due to the co-location of the reflection source being a single sensing element, there exists much commonality to the spectral features being tracked such as their time delay (distance from interrogator), their gain/loss characteristics, their temperature etc and as such it may be advantageous to process their signals with common parameters of gain, delay time, threshold level, number of fitting points etc. As such, in one embodiment, the system allows the user to define such multi-sensor regions such that the system processes their signals with some commonality.

In one embodiment, the region information is stored on the interrogation unit and the adjustment of the regions is controlled automatically by a software running either externally on a computational unit such that new region parameters are fed to the interrogation unit periodically. This allows for elimination of the computational load of decision making on the region locations from the interrogation unit. Alternatively, the region adjustment algorithms can also be executed in the interrogation unit.

In order that the interrogator can provide accurate measurements of the optical sensor system, it will be appreciated that the optical sensor array must first be configured for operation with the interrogator. This configuration procedure assigns the initial detection region to each individual sensor in the optical sensor system based on the optical response of each sensor under a set of calibration conditions. Furthermore, the configuration procedure determines the settings of each optical sensor for optimum performance with the interrogator.

It will be appreciated that it is necessary for the specifications of each optical sensor to be known for the configuration procedure. These specifications may be different for each optical sensor on the fiber, and include for example the Full Width at Half Maximum (FWHM), reflected power, spatial position, and wavelength.

Figure 4:
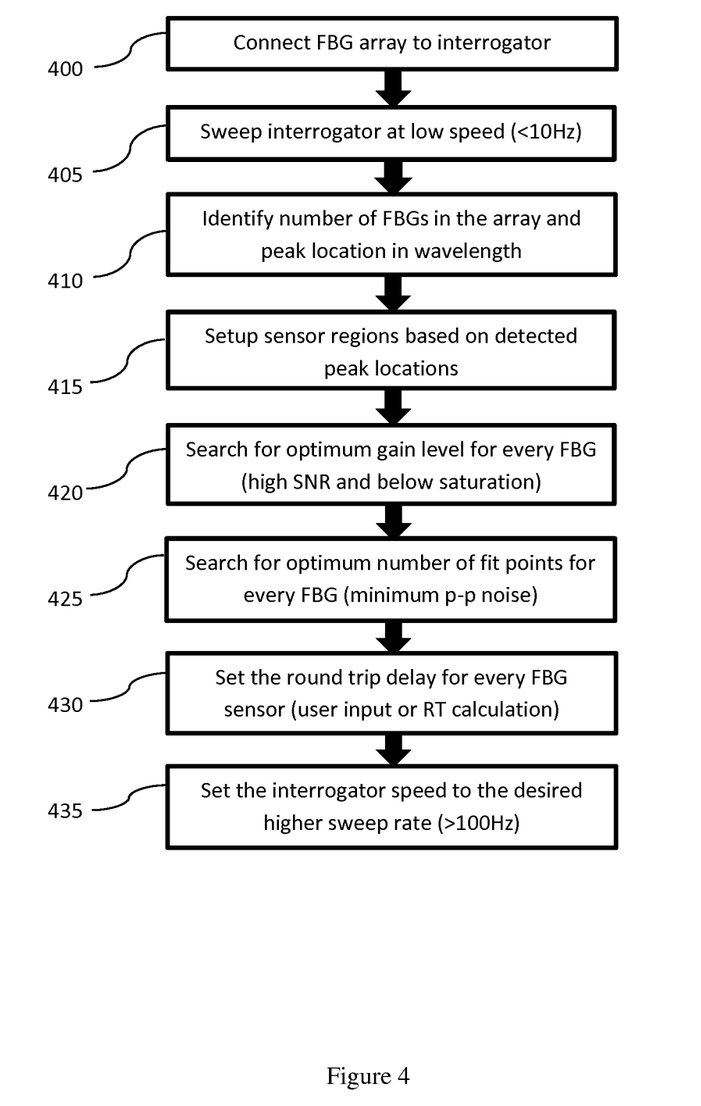
FIG. 4 shows a flow chart of the main steps involved in one embodiment of the configuration procedure of the present invention.

FIG. 4 shows a flow chart of the main steps involved in one embodiment of the configuration procedure. In the first step (step 400), a fiber including an array of n optical fibers with different wavelengths and located at different locations in the fiber is connected to one of the interrogator channels.

In step 405, the interrogator's laser is set to sweep at low speeds and low tuning rates, such as for example less than 10 Hz. This is in order to avoid any error caused by round trip delay. In this regard, a typical path length delay in a single mode fiber is ~5 ns/m. Accordingly, to enable the interrogator to correct the reflected FBG wavelength with respect to the internal wavelength references, it will be appreciated that the path length difference needs to be compensated. For example, a 1 m round trip (RT) distance error causes a 5 ns RT delay time error, which results in a 0.5 pm measured FBG peak wavelength error, on the assumption that the laser tuning rate is 0.1 pm/ns. Thus, if the tuning rate is reduced by a factor of 1000 (0.1 pm/us) then the error would also reduce by a factor of 1000 (0.5 fm error). This also reduces the risk of discontinuities in the reflected spectrum during the stitching of mini-sweeps of a tunable laser.

Figure 5:
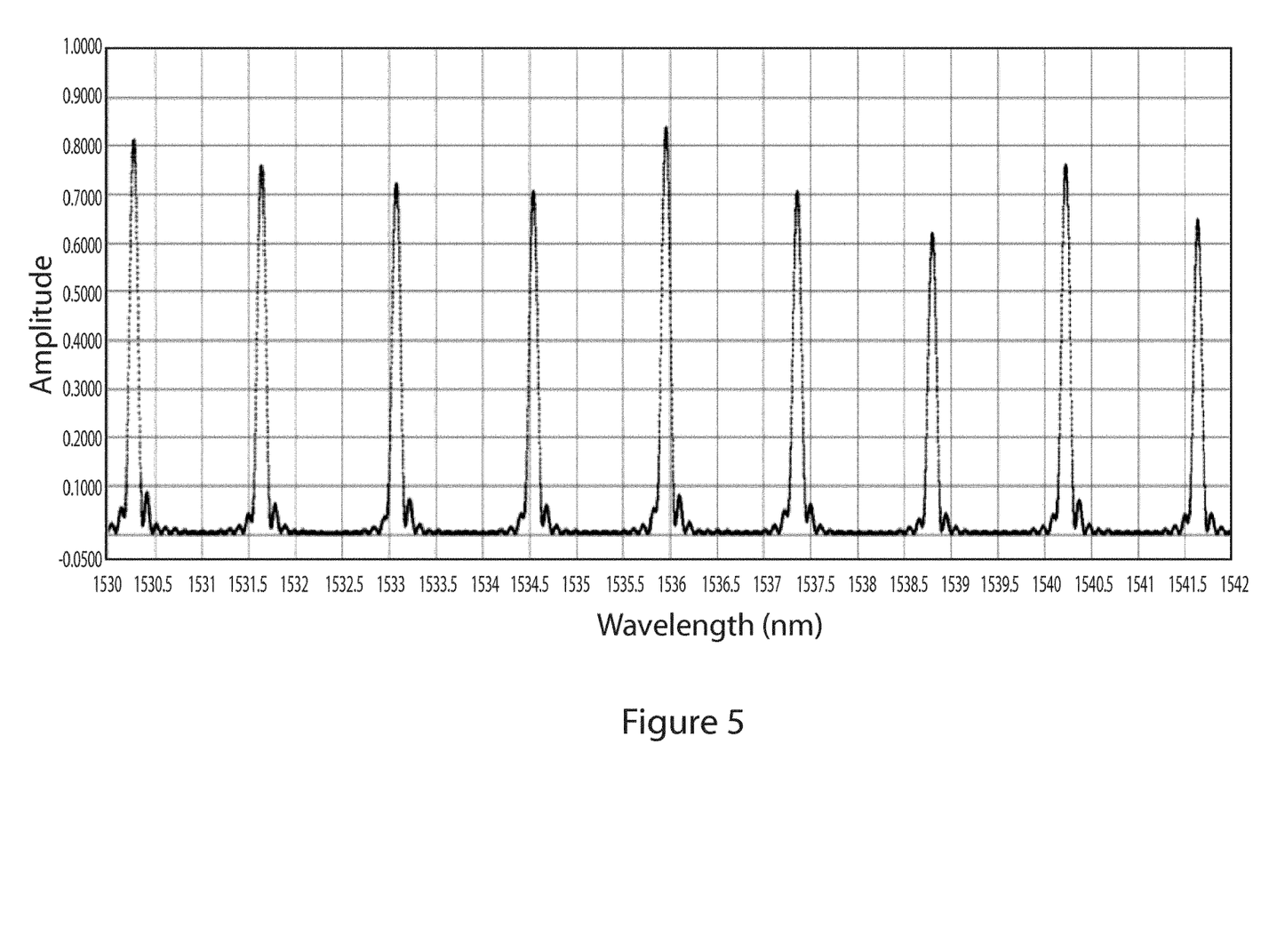
FIG. 5 shows the identification of the number of optical sensors in the optical sensor system as per the first part of step 410 of the flow chart of FIG. 4.
Figure 6:
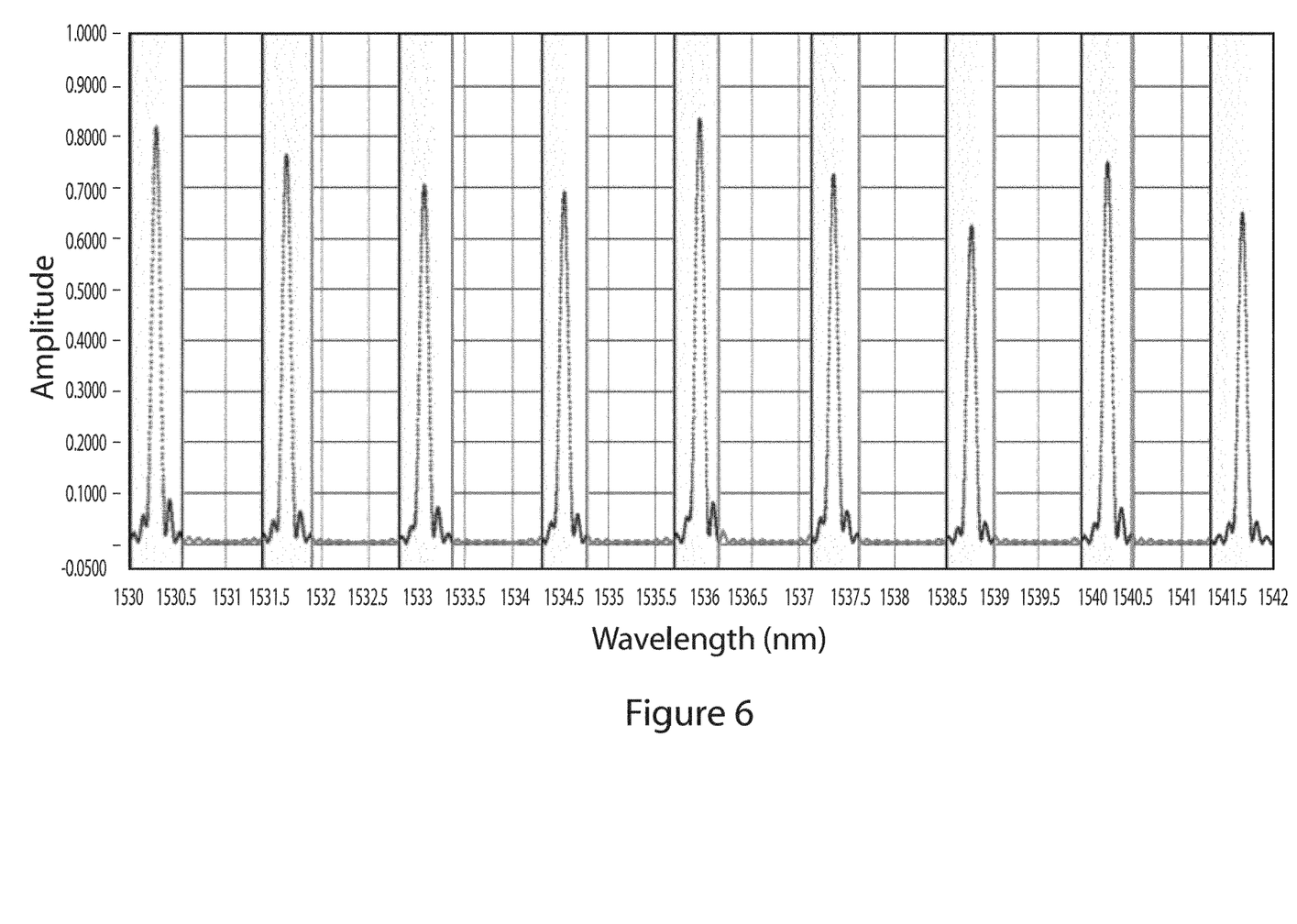
FIG. 6 shows the identification of the peak locations of each of the optical sensors in the array as per the second part of step 410 of the flow chart of FIG. 4.
Figure 7A:
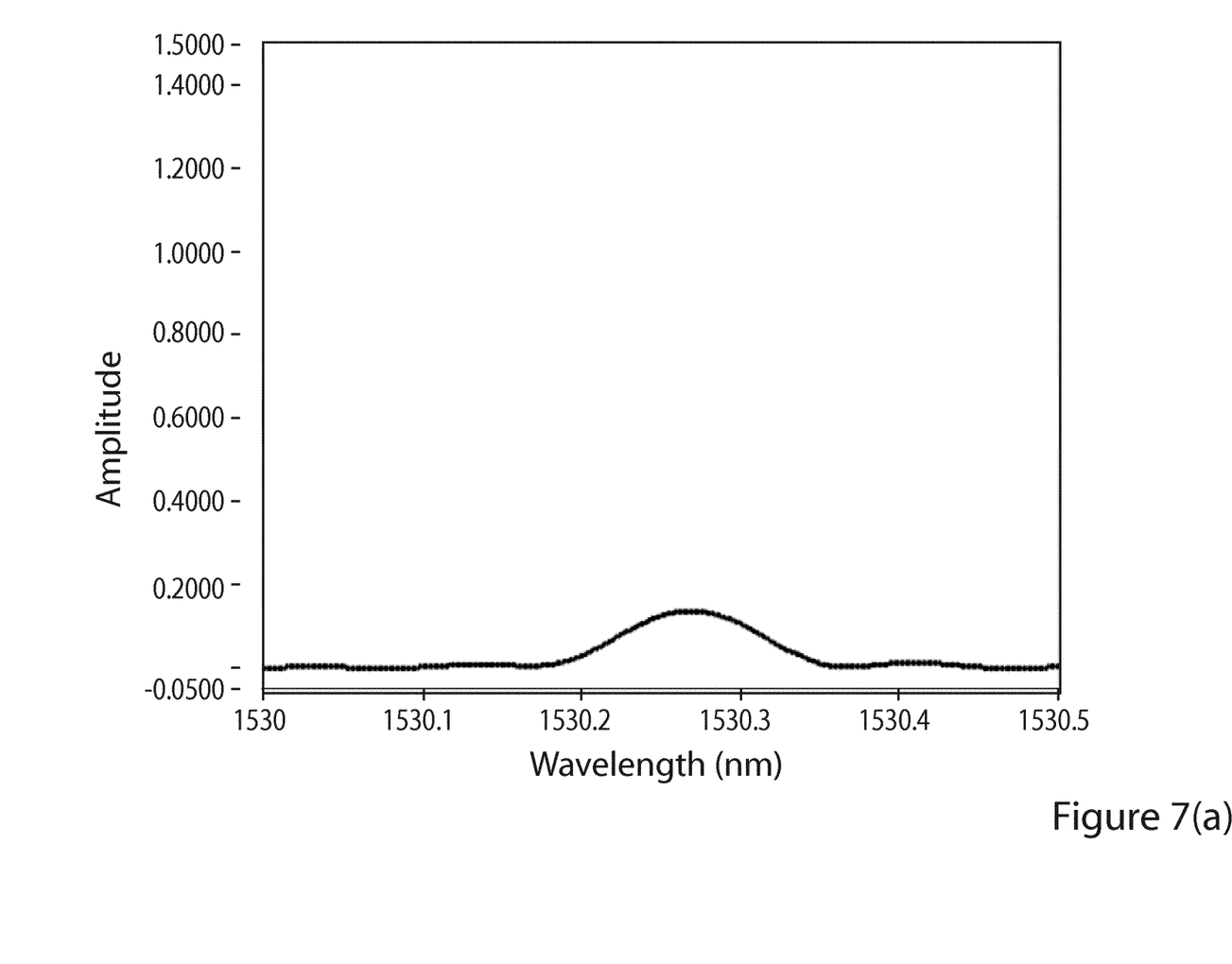
FIGS. 7(a)-7(d) show the search for the optimum gain level for each sensor as per step 420 of the flow chart of FIG. 4.
Figure 7B:
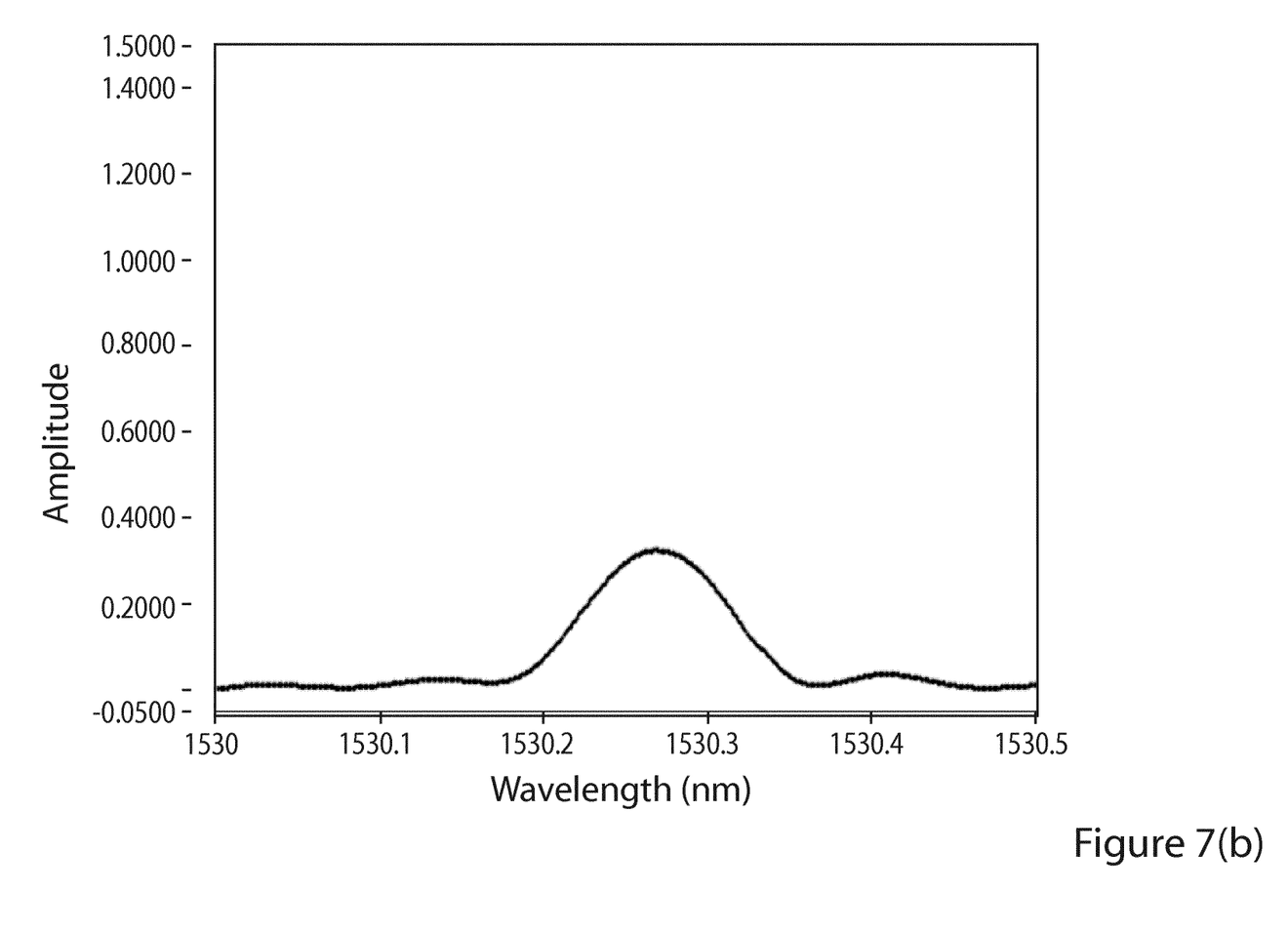
Figure 7C:
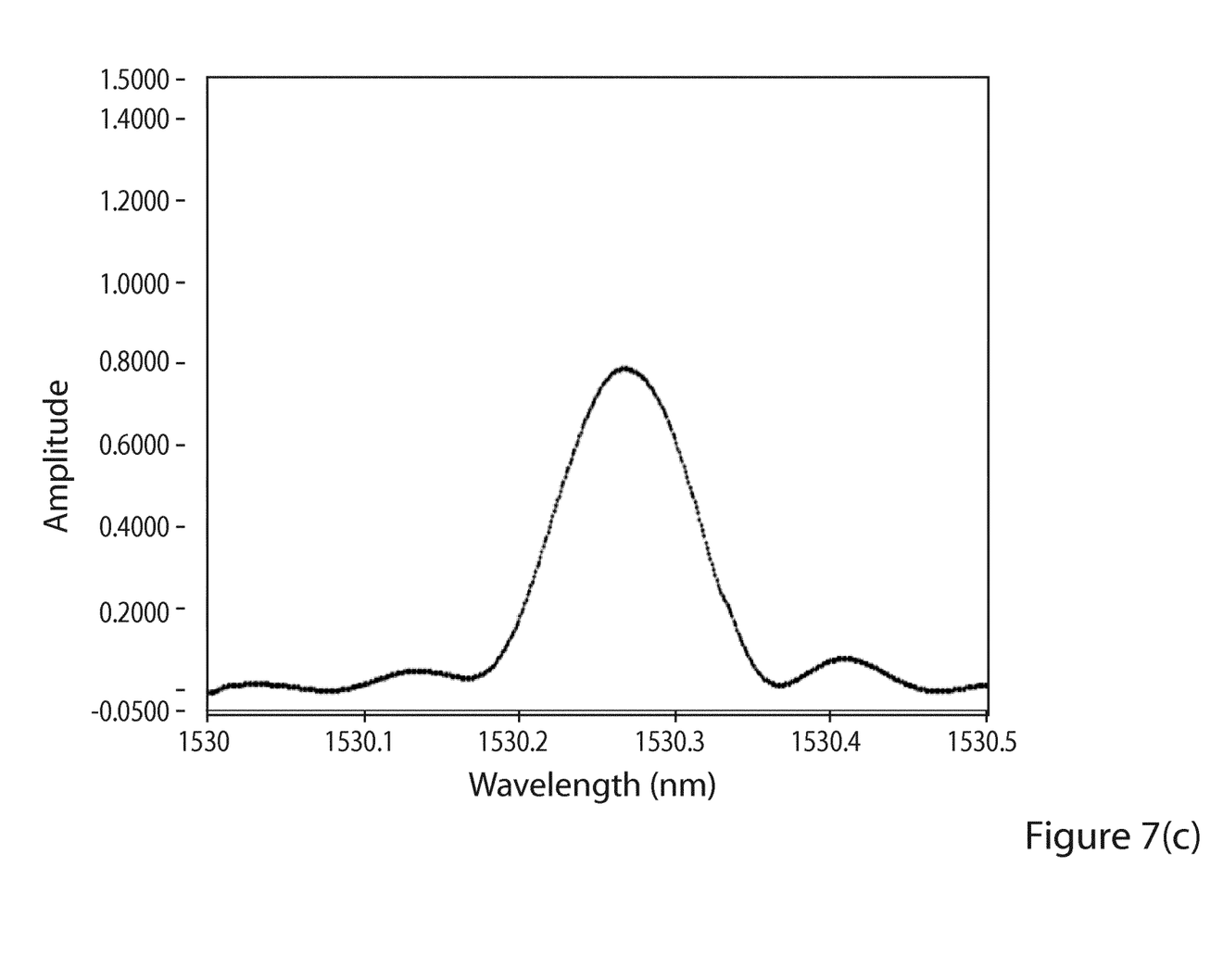
Figure 7D:
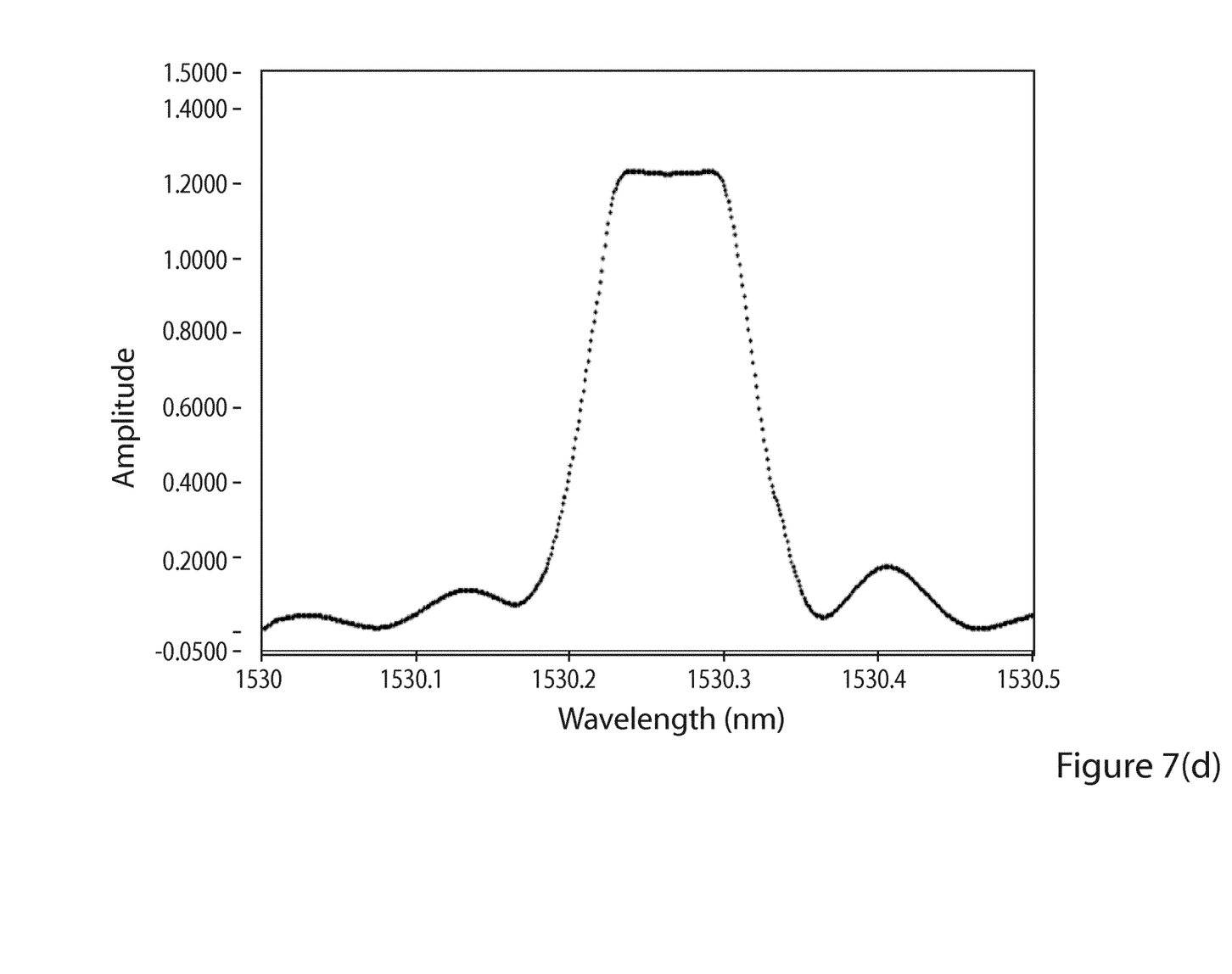

In step 410, the number of optical sensors in the array is identified by the interrogator (as shown in FIG. 5), and the peak optical response or location of each sensor in the bandwidth of the optical sensor system is detected. This is illustrated in FIG. 6.

In step 415, the initial detection region is assigned to each of the optical sensors based on the detection of the peak optical response of each optical sensor.

In step 420, the optimum gain setting in respect of each of the optical sensors is determined. This corresponds to the gain setting that delivers optimum amplitude level and signal to noise ratio (SNR), in addition to avoiding any saturation. This is illustrated in FIGS. 7a to 7d, which Figure shows the different FBG responses in respect of different gain settings, where the gain is increased by approximately 3.5 dB between each consecutive figure.

Once the gain is set to its optimum value in respect of each optical sensor, the number of fit points is adjusted within a certain range, and the tracked sensor peak is measured over several scans to evaluate the peak to peak (p-p) noise.

Figure 8:
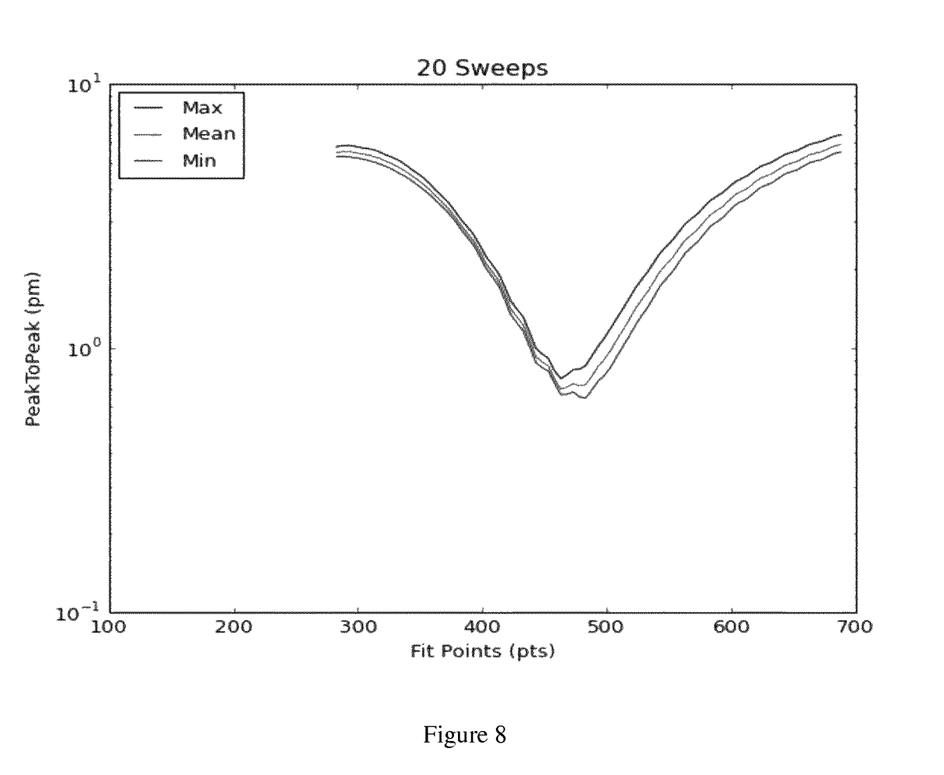
FIG. 8 shows the search for the optimum number of fit points for each sensor as per step 425 of the flow chart of FIG. 4.

This process enables the optimum number of fit points in respect of each sensor to be determined, which corresponds to the minimum p-p noise (step 425). This process is illustrated in FIG. 8.

In step 430, the correct round trip distance for each individual sensor is set. Typically, this is set manually, by entering the calculated round trip delay in metres for each individual sensor. However, in an alternative embodiment, the round trip distance may be set through the use of standard Optical Time Domain Reflectometer (OTDR) techniques, by setting the laser at a static wavelength where the sensor is located, and sending pulses to measure the round trip delay.

After the round trip delays are set correctly per sensor and detection region, the sweep speed and tuning rate may be increased to the desired sweep rate for performing the actual measurements (step 435) in accordance with the method of the invention.

While in the preferred embodiment, the fiber-optic based sensor is an FBG, with each FBG comprising a Bragg wavelength or peak wavelength wherein, depending on the strain and temperature of the fiber in the vicinity of the FBG, the Bragg wavelength is changing. However, it will be appreciated that in other embodiments, the sensor may transmit only part of the optical signal or attenuate the optical signal for the assigned wavelength. Furthermore, a person skilled in the art will appreciate that the present invention could equally well be applied to any other type of intrinsic fiber optic sensor in place of a FBG.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method for measuring an optical sensor system comprising an array of intrinsic fiber optic sensors at an interrogator comprising an optical source and an optical detector, the method comprising:
   emitting an optical signal to the array of intrinsic fiber optic sensors;
   detecting optical responses from the array of intrinsic fiber optic sensors to the optical signal emitted to the array of intrinsic fiber optic sensors;
   associating each detected optical response with an individual sensor by determining within which detection region among a plurality of detection regions assigned to the individual sensor the optical response is detected, wherein each detection region corresponds to a wavelength range in a bandwidth of the optical sensor system; and
   performing signal processing on each optical response to measure a value of a physical parameter detected by its associated sensor, wherein, for each sensor, a calibration of a detection region assigned to each sensor is performed at predetermined intervals, wherein a minimum bandwidth of the detection region assigned to each sensor during calibration corresponds to a required dynamic signal range of the sensor, and wherein the calibration of the detection region assigned to each sensor comprises:
      determining if a spacing between boundaries of two or more detection regions is less than a threshold value; and
      if it is determined that the spacing is less than the threshold value, proportionally reducing the bandwidth of all of the plurality of detection regions while retaining a required minimum bandwidth of each detection region until the spacing between the boundaries of the two or more detection regions exceeds the threshold value.

2. The method of claim 1, wherein an initial detection region assigned to each sensor is set during a configuration procedure and based on an optical response of each sensor under a set of calibration conditions.

3. The method of claim 2, wherein a center wavelength of the detection region assigned to each sensor during the configuration procedure comprises a wavelength value corresponding to peak intensity of the optical response of the sensor under a set of calibration conditions.

4. The method of claim 2, wherein the optical response of each sensor under a set of calibration conditions corresponds to the optical response of each sensor prior to the physical parameter acting on the sensor.

5. The method of claim 2, further comprising performing the calibration of the detection region assigned to each sensor when a difference between the detected optical response for one or more sensors and the optical response of the one or more sensors under the set of calibration conditions exceeds a threshold value.

6. The method of claim 2, further comprising performing a configuration procedure to assign an initial detection region to each sensor and determine optimum settings of each sensor for the detection of the optical responses from the sensors.

7. The method of claim 6, wherein the configuration procedure comprises:
   sweeping the optical signal at a low speed;
   identifying a peak optical response associated with each sensor; and
   assigning an initial detection region to the each sensor based on the peak optical response associated with the each sensor.

8. The method of claim 1, further comprising equally allocating any remaining bandwidth between the detection regions once the minimum bandwidth of each detection region has been satisfied.

9. The method of claim 1, further comprising allocating any remaining bandwidth between the detection regions once the minimum bandwidth of each detection region has been satisfied based on user input.

10. The method of claim 1, further comprising allocating any remaining bandwidth between the detection regions once the minimum bandwidth of each detection region has been satisfied based on observed behavior of the optical sensor system.

11. The method of claim 1, further comprising performing the calibration of the detection region assigned to each sensor at periodic time intervals or after a predetermined number of sensor measurements.

12. The method of claim 1, wherein the calibration of the detection region assigned to each sensor further comprises:

adjusting a center wavelength of the detection region for each sensor to a value of the detected optical response associated with the each sensor.

13. The method of claim 1, further comprising:

determining one or more parameters in respect of each detection region, the one or more parameters including a minimum amplitude of an optical response detectable in the each detection region, a selected curve-fitting algorithm for extracting features of an optical response detected in the each detection region, a round-trip delay or a gain associated with the each detection region.

14. The method of claim 13, wherein performing signal processing on each optical response to measure the value of the physical parameter detected by its associated sensor comprises:

performing signal processing on a detected optical response based on the one or more parameters in respect of a detection region of its associated sensor; and calculating a deviation between the signal processed optical response and the optical response of the sensor under a set of calibration conditions acting on the sensor to determine the value of the physical parameter detected by the sensor.

15. An optical sensor system comprising:
an array of intrinsic fiber optic sensors;
an interrogator comprising:
  an optical source configured to emit an optical signal to the array of intrinsic fiber optic sensors; and
  a detector configured to detect optical responses of the array of intrinsic fiber optic sensors to the optical signal; and
a processor configured to:
  associate each detected optical response with an individual sensor by determining within which detection region among a plurality of detection regions assigned to the individual sensors the optical response is detected; wherein each detection region corresponds to a wavelength range in a bandwidth of the optical sensor system; and
  for each optical response, measure a value of a physical parameter detected by a sensor associated with the each optical response,
wherein, for each sensor, a calibration of a detection region assigned to the each sensor is performed at predetermined intervals,
wherein a minimum bandwidth of the detection region assigned to each sensor during calibration corresponds to a dynamic signal range of the sensor, and
wherein the detection region assigned to each sensor is calibrated by:
  the processor further configured to determine whether a spacing between boundaries of two or more detection regions is less than a threshold value; and
  if it is determined that the spacing between the boundaries of the two or more detection regions is less than the threshold value, proportionally reducing the bandwidth of all of the detection regions while retaining a required minimum bandwidth of each detection region until the spacing between the boundaries of the two or more detection regions exceeds the threshold value.

* * * * *